US011765460B2

(12) United States Patent
Jhawar et al.

(10) Patent No.: US 11,765,460 B2
(45) Date of Patent: Sep. 19, 2023

(54) DIGITAL ZOOM BASED ON REMOTE USER INSTRUCTIONS OF LIVE VIDEO

(71) Applicant: RealWear, Inc., Vancouver, WA (US)

(72) Inventors: Sanjay Jhawar, Menlo Park, CA (US); Ken Lustig, Mercer Island, WA (US)

(73) Assignee: RealWear, Inc., Vancouver, WA (US)

( * ) Notice: Subject to any disclaimer, the term of this patent is extended or adjusted under 35 U.S.C. 154(b) by 0 days.

(21) Appl. No.: 16/909,387

(22) Filed: Jun. 23, 2020

(65) Prior Publication Data
US 2021/0400198 A1 Dec. 23, 2021

(51) Int. Cl.
| *H04N 23/69* | (2023.01) |
| *H04N 7/18* | (2006.01) |
| *H04N 1/00* | (2006.01) |
| *G02B 27/01* | (2006.01) |
| *H04N 23/63* | (2023.01) |
| *H04N 23/661* | (2023.01) |
| *H04N 25/443* | (2023.01) |
| *H04N 101/00* | (2006.01) |
| *H04N 25/46* | (2023.01) |
| *H04N 25/61* | (2023.01) |

(52) U.S. Cl.
CPC .......... *H04N 23/69* (2023.01); *G02B 27/017* (2013.01); *H04N 1/00129* (2013.01); *H04N 7/185* (2013.01); *H04N 23/635* (2023.01); *H04N 23/661* (2023.01); *H04N 25/443* (2023.01); *H04N 1/00408* (2013.01); *H04N 23/631* (2023.01); *H04N 25/46* (2023.01); *H04N 25/61* (2023.01); *H04N 2101/00* (2013.01); *H04N 2201/0084* (2013.01)

(58) Field of Classification Search
CPC ........ G02B 27/01; G02B 27/017–0176; G06F 1/163; H04N 5/232; H04N 5/23203; H04N 5/23206; H04N 5/23296; H04N 5/3454; H04N 5/347; H04N 5/3572; H04N 1/00129; H04N 7/181–185; H04N 7/18–188; H04N 1/00204–00244
See application file for complete search history.

(56) References Cited

U.S. PATENT DOCUMENTS

| 9,584,774 B2 | 2/2017 | Bekiares et al. |
| 10,313,417 B2 | 6/2019 | Chen et al. |
| 10,395,428 B2 | 8/2019 | Stafford et al. |

(Continued)

*Primary Examiner* — Paul M Berardesca
(74) *Attorney, Agent, or Firm* — Shook, Hardy & Bacon L.L.P.

(57) ABSTRACT

Systems and methods facilitate digital zoom of live video based on remote user instructions. A user of a remote device may desire to zoom in on a particular aspect of a copy of a full image captured by a sensor at a first resolution and communicated to the remote device at a second resolution less than the first resolution. A selection that corresponds to a user-selected area of the copy and corresponding to a portion of the sensor is received by the sensor. Based on the selection, an instruction is generated to capture a second electronic image utilizing the portion of the sensor with the first resolution. Thus, rather than zooming into the first electronic image at the second resolution, the second electronic image corresponding to the portion of the sensor is captured at the first resolution and then converted to the second resolution, resulting in a higher resolution zoom.

20 Claims, 8 Drawing Sheets

(56) References Cited

U.S. PATENT DOCUMENTS

| | | | | |
|---|---|---|---|---|
| 2004/0017491 | A1* | 1/2004 | Stavely | H04N 5/3572 348/240.2 |
| 2006/0125937 | A1* | 6/2006 | LeGall | H04N 5/23296 348/240.99 |
| 2009/0247833 | A1* | 10/2009 | Tanaka | G09B 23/285 600/188 |
| 2011/0043644 | A1* | 2/2011 | Munger | H04N 5/23296 348/207.1 |
| 2012/0236181 | A1* | 9/2012 | Noyes | H04N 5/23203 348/240.2 |
| 2019/0307313 | A1* | 10/2019 | Wade | A61B 1/05 |

* cited by examiner

DIGITAL ZOOM BASED ON REMOTE USER INSTRUCTIONS OF LIVE VIDEO

BACKGROUND

A head-mounted display (HMD) can have a camera that streams video to a remote expert. For instance, a remote expert can view what the wearer of the HMD is seeing, and can instruct the wearer how to perform operations (e.g., training for use of machinery). Sometimes, the remote expert cannot see important details of the video being streamed. For instance, the streamed video at 1080p resolution may depict a relatively clear image, but a serial number of the machine being depicted may be difficult to read (e.g., poor lighting, small barcodes, etc.). While the remote expert could try to zoom, the resolution is still limited to the 1080p image being received, thus the serial number will be blurry.

Safety precautions prevent the HMD user from simply moving closer to the machine. For example, the machine might have moving parts or high voltage. Instead, conventional solutions might advise the remote expert to activate a camera mode, where a digital image can be captured at full resolution, and sent to the remote expert to then view and zoom as needed. However, this workflow is choppy and not streamlined, as it would require an interruption of the video stream to capture the image, receive it, and re-enable the video stream. Moreover, current bandwidth limitations make it impossible to continue the video stream in camera mode at full resolution.

SUMMARY OF THE INVENTION

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

At a high level, embodiments described herein, include a method for operating a computing device, such as but not limited to a wearable device. More particularly, embodiments of the technology described herein are directed to facilitating digital zoom of live video provided by a wearable device based on remote user instructions. The wearable device can include an optical device (e.g. optical input/output device(s) and/or sensor(s)). In some embodiments, the wearable device can include a data transceiver (i.e. a data receiver and a data transmitter), and further, the wearable device can include a display device. In some embodiments, the wearable device is a head-mounted display (HMD) device.

Embodiments of the present invention communicate, to a remote device (e.g., a computing device being operated by a remote mentor), a copy of a first electronic image that was captured via a sensor with a first resolution (e.g., 48 megapixels). The copy is communicated at a second resolution less than the first resolution (e.g., 1080p). A selection that corresponds to a user-selected area of the communicated copy is received from the remote device. For example, the remote mentor may desire to zoom in on a particular aspect of the full image. The user-selected area corresponds to a portion of the sensor. Based on the received selection, an instruction is generated to capture a second electronic image utilizing the portion of the sensor with the first resolution. In response to receiving the generated instruction, the sensor captures the second electronic image. The second electronic image is provided for display to the remote device at the second resolution. Thus, rather than zooming into the first electronic image at the second resolution, the second electronic image corresponding to the portion of the sensor is captured at the first resolution and then converted to the second resolution, resulting in a higher resolution zoom.

Additional objects, advantages, and novel features of the invention will be set forth in part in the description which follows, and in part will become apparent to those skilled in the art upon examination of the following, or can be learned by practice of the invention.

BRIEF DESCRIPTION OF THE DRAWINGS

The features of the invention noted above are explained in more detail with reference to the embodiments illustrated in the attached drawing figures, in which like reference numerals denote like elements, in which FIGS. 1-10 illustrate embodiments of the present invention and in which:

DETAILED DESCRIPTION

Embodiments of the present invention relate to enabling a user of a remote computing device to zoom in on a user-selected area of a first image of a video being streamed. That is, embodiments include methods of operating various computing devices to provide a second image of the user-selected area in the same resolution of the first image. Such computing devices include, but are not otherwise limited to wearable devices. Such wearable devices include, but are not otherwise limited to head-mounted display (HMD) devices. Although many of the various embodiments discussed herein are directed to wearable devices, it should be understood that the various methods and systems for providing visual elements are not limited to wearable devices, such as HMD devices. Rather, the various methods may be employed in other computing devices, such as but not limited to networked camera devices that include one or more sensors, or virtually any computing device that includes at least one sensor.

Embodiments of the present invention facilitate digital zoom of live video based on remote user instructions. A user of a remote device may desire to zoom in on a particular aspect of a copy of a full image captured by a sensor at a first resolution and communicated to the remote device at a second resolution less than the first resolution. A selection that corresponds to a user-selected area of the copy and corresponding to a portion of the sensor is received by the sensor. Based on the selection, an instruction is generated to capture a second electronic image utilizing the portion of the sensor with the first resolution. Thus, rather than zooming into the first electronic image at the second resolution, the second electronic image corresponding to the portion of the sensor is captured at the first resolution and then converted to the second resolution, resulting in a higher resolution zoom.

In some embodiments, variable pixel binning can be performed for a portion of the sensor, rather than the sensor as a whole to address low light conditions in the portion of the sensor. Additionally or alternatively, image correction can be performed on the second electronic image to address lens profile correction issues that may be introduced by the digital zoom.

Accordingly, in one aspect, an embodiment is directed to a computer-implemented method. The method comprises communicating, to a remote device, a copy of a first electronic image that was captured via a sensor with a first resolution, wherein the copy is communicated at a second resolution less than the first resolution. The method also includes receiving, from the remote device, a selection that corresponds to a user-selected area of the communicated copy, wherein the user-selected area further corresponds to a portion of the sensor. The method further comprises based on the received selection, generating an instruction to capture a second electronic image utilizing the portion of the sensor with the first resolution. The method also comprises causing the sensor to capture the second electronic image in response to the generated instruction. The method further comprises providing for display, to the remote device, the second electronic image at the second resolution.

In another aspect of the invention, an embodiment of the present invention is directed to at least one computer storage media having instructions thereon that, when executed by at least one process of a computing system, cause the computing system to: communicate, to a remote device, a copy of a first electronic image that was captured via a sensor with a first resolution, wherein the copy is communicated at a second resolution less than the first resolution; generate an instruction to capture a second electronic image utilizing a portion of the sensor with the first resolution; cause the sensor to capture the second electronic image in response to the generated instruction; and provide for display, to the remote device, the second electronic image at the second resolution.

In a further aspect, an embodiment is directed to a computerized system that includes at least one processor and at least one computer storage media storing computer-useable instructions that, when executed by the at least one processor, causes the at least one processor to: communicate, to a remote device, a copy of a first electronic image that was captured via a sensor with a first resolution, wherein the copy is communicated at a second resolution less than the first resolution; receive, from the remote device, a selection that corresponds to a user-selected area of the communicated copy, wherein the user-selected area further corresponds to a portion of the sensor; based on the received selection, generate an instruction to capture a second electronic image utilizing the portion of the sensor with the first resolution; cause the sensor to capture the second electronic image in response to the generated instruction; and provide for display, to the remote device, the second electronic image at the second resolution.

Figure 1:
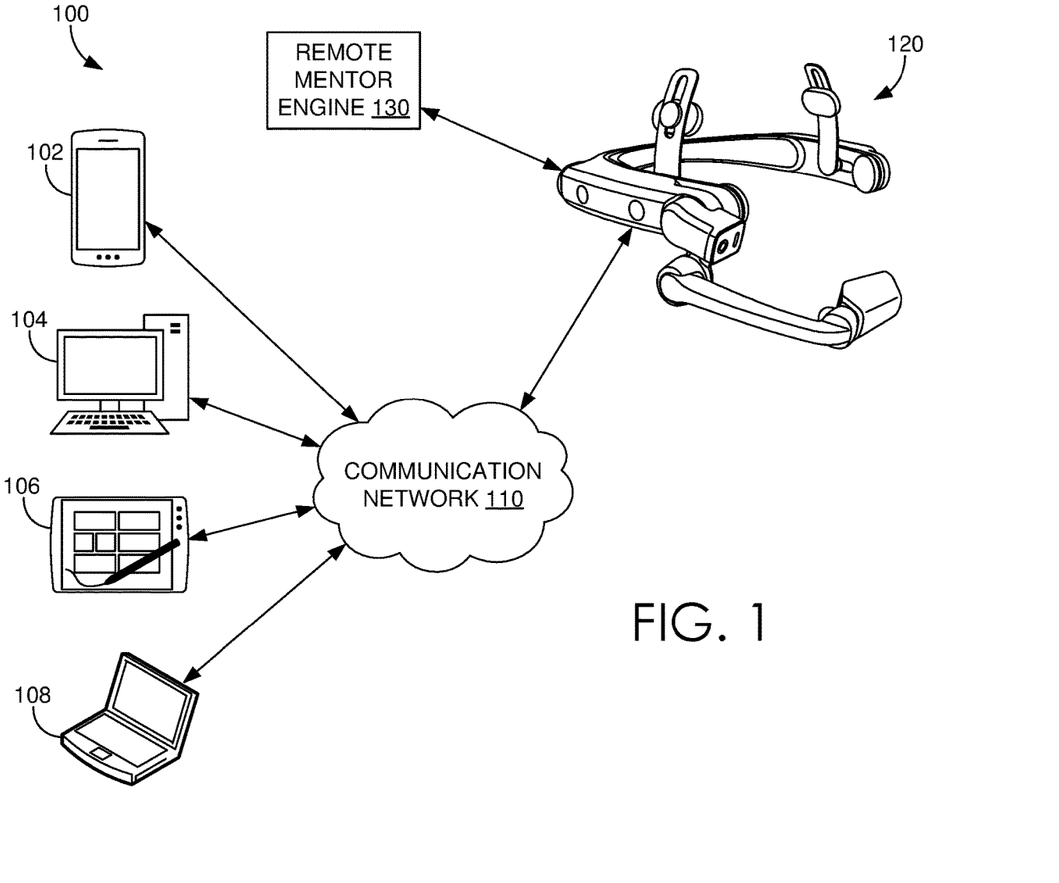
FIG. 1 provides a schematic diagram showing an exemplary operating environment for a remote mentor system in accordance with some implementations of the present disclosure.

FIG. 1 provides a schematic diagram showing an exemplary operating environment 100 for operating a wearable device in accordance with some implementations of the present disclosure. Environment 100 includes one or more wearable devices, such as but not limited to head-mounted display (HMD) device 120 and one or more user computing devices. Such user computing devices include, but are not otherwise limited to smartphone 102, desktop 104, tablet 106, and laptop 108. HMD device 120 is a wearable computing device that provides computing and communication capabilities to the wearer. In the non-limiting body shown in FIG. 1, a wearable device (e.g. HMD device 120) may be worn about the head of the user. Other embodiments are not so limited. Various embodiments of user computing devices, such as computing devices 102-108 are discussed in conjunction with FIG. 13.

Environment 100 additionally includes a communication network, such as but not limited to communication network 110, which communicatively couples each of user computing devices 102-108 and HMD device 120. Communication network 110 may be any communication network, including virtually any wired and/or wireless communication technologies, wired and/or wireless communication protocols, and the like. It should be understood that communication network 110 may be virtually any network that communicatively couples at least one of user computing devices 102-108 with a wearable device, such as but not limited to HMD device 120.

HMD device 120 includes remote mentor engine 130. Remote mentor engine 130 may be in communication with one or more components of a camera or sensor associated with the HMD device 120. For example, remote mentor engine 130 may be in communication with the camera, the camera subsystem, the camera driver(s), the operating system of the camera, an image processor of the operating system of the camera, and the like. The remote mentor engine 130 may generate and/or provide instructions to a sensor to instruct the sensor hardware to capture an image from a subset area (e.g., a user-selected area that corresponds to a portion of the sensor).

Figure 2:
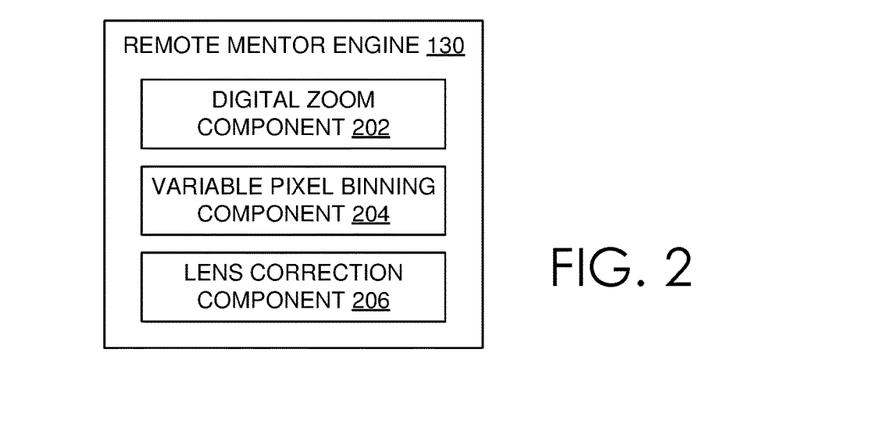
FIG. 2 provides a schematic diagram showing an exemplary remote mentor engine, in accordance with some implementations of the present disclosure.

Turning now to FIG. 2, remote mentor engine 130 comprises digital zoom component 202, variable pixel binning component 204, and lens correction component 206. Digital zoom component 202 generally enables a remote user, via a remote device, to select an area of a copy of an image received from a sensor and receive a copy of a second image of only the selected area.

Typically, a copy of an image is communicated to a remote device in a compressed version. As can be appreciated, compressing the image and communicating the compressed copy of the image preserves bandwidth, especially in cases where live video is being streamed to the remote device. However, if the remote user wishes to zoom in on a portion of the compressed image, the quality for the portion of the image is further reduced and often appears pixelated.

In embodiments, a remote user, via a remote device, initially receives a copy of a first electronic image that was captured via a sensor with a first resolution. As discussed, the copy is communicated at a second resolution less than the first resolution (i.e., compressed). Digital zoom component 202 receives, from the remote device, a selection that corresponds to a user-selected area of the communicated copy. Importantly, the user-selected area only corresponds to a portion of the sensor. Based on the received selection, digital zoom component 202 generates an instruction to capture a second electronic image utilizing the portion of the sensor with the first resolution. The generated instruction causes the sensor (i.e., the portion of the sensor) to capture the second electronic image. The second electronic image is then provided for display to the remote device at the second resolution.

In this way, rather than zooming in on the copy of the image and further reducing the quality of the image, digital zoom component 202 takes the user-selected area and generates instructions that causes only the portion of the sensor corresponding to the user-selected area to capture a second electronic image at full resolution (or the same resolution as the first electronic image prior to being compressed and communicated to the remote device). Thus, even though the second electronic image is compressed before it is communicated to the remote user, digital zoom component 202 effectively prevents the additional loss of resolution that would otherwise be introduced to the first electronic image if the remote user simply used a zoom function to zoom in on the user-selected area and the remote user is able to see the user-selected area with the necessary detail to, for example, read small part numbers or barcodes on equipment.

Variable pixel binning component 204 generally detects low light for a portion of the sensor and generates an instruction to perform variable pixel binning for the portion of the sensor. The variable pixel binning may be performed independently from pixel binning that may be performed for the sensor as a whole. In this way, pixel binning may be performed for the user-selected area when the portion of the sensor is not capturing sufficient light.

For clarity, pixel binning refers to the combination of adjacent pixels in a sensor to create a single pixel in an image. Pixels are the physical element on a sensor that capture light. Generally, higher resolution sensors have a larger number of pixels. However, the only way to increase the number of pixels in a sensor is to increase the physical size of the sensor, or reduce the physical size of the pixels which has an adverse effect in low-light scenarios. To overcome this adverse effect, pixel binning can be utilized to combine, for example, four pixels into one. If a given sensor has 0.5 micron pixels, pixel binning produces the equivalent of a 1.0 micron pixel.

In conventional sensors, pixel binning reduces the quality of the image by a factor of four (e.g., an image captured with a 16 MP sensor with pixel binning results in a 4 MP image). Although the image is captured at full resolution, pixel binning may improve the lighting of the image as a whole but also reduces the quality of the image. When the image is communicated to the remote user, it is compressed, reducing the quality even more. A simple zoom performed by the remote user of the compressed image reduces the resolution of the image even further and negates any lighting benefit that may be otherwise gained by employing pixel binning.

However, variable pixel binning component 204 enables pixel binning to be performed using only the portion of the sensor corresponding to the user-selected area, separately from pixel binning performed on the image as a whole. In this way, the user-selected area is captured by the portion of the sensor as a second electronic image at full resolution, and pixel binning is performed to improve the lighting. Although the variable pixel binning reduces the quality of the second electronic image and the image is still compressed when it is communicated to the remote user, there is no need for the remote user to zoom in on the image and the lighting benefit is still realized.

Variable lens correction component 206 generally generates a correction instruction to provide variable lens correction for the second electronic image. When a user-selected area of an electronic image is received and an instruction is generated to capture a second electronic image utilizing only the portion of the sensor corresponding to the user-selected area, blurring or distortion may be introduced in the second electronic image due to lens distortion (e.g., optical distortion or perspective distortion).

When lens distortion is detected at a border of the second electronic image, a correction instruction may be generated by variable lens correction component 206 to apply image correction to the border of the second electronic image (i.e., a border of the user-selected area). In response to the correction instruction, image correction is applied by variable lens correction component 206 to the second electronic image. The second electric image with image correction can then be provided for display and lens distortion is reduced.

Figure 3A:
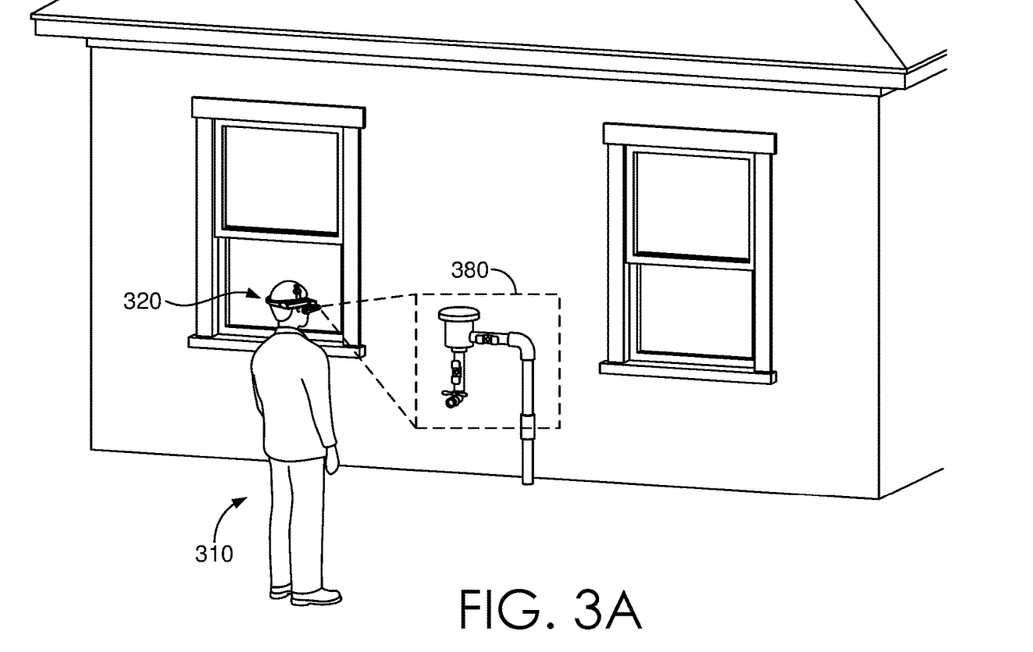
FIG. 3A shows a user employing a wearable device, in accordance with some of the implementations of the present disclosure.
Figure 3B:
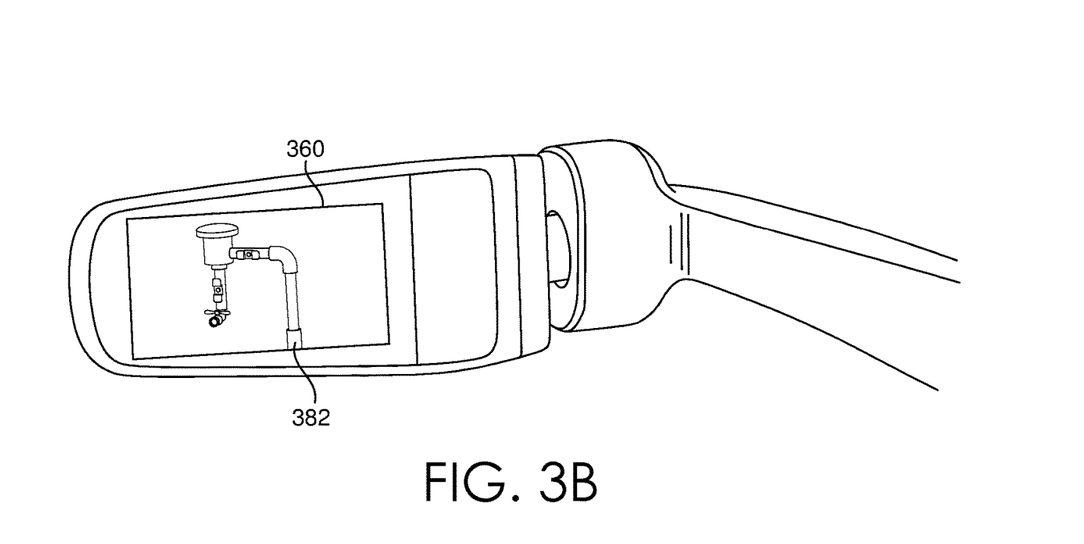
FIG. 3B shows a display device of the wearable device of FIG. 3A displaying image, in accordance with some of the implementations of the present disclosure.

FIG. 3A shows a user 310 employing a wearable device 320, in accordance with some of the implementations of the present disclosure. Wearable device 320 may be similar to wearable device 120 of FIG. 1. More particularly, in FIG. 3, a photon detector (e.g. a sensor or camera) of wearable device 320 generates image data that encodes a field-of-view 380 (FOV) of the sensor. FIG. 3B shows a display device 360 of the wearable device of FIG. 3A displaying image data 382, in accordance with some of the implementations of the present disclosure. As shown in FIG. 3B, display device 360 is displaying the image data 382 generated in FIG. 3A. That is, the displayed image data 382 encodes the FOV 380 of the sensor of the wearable device.

Figure 4:
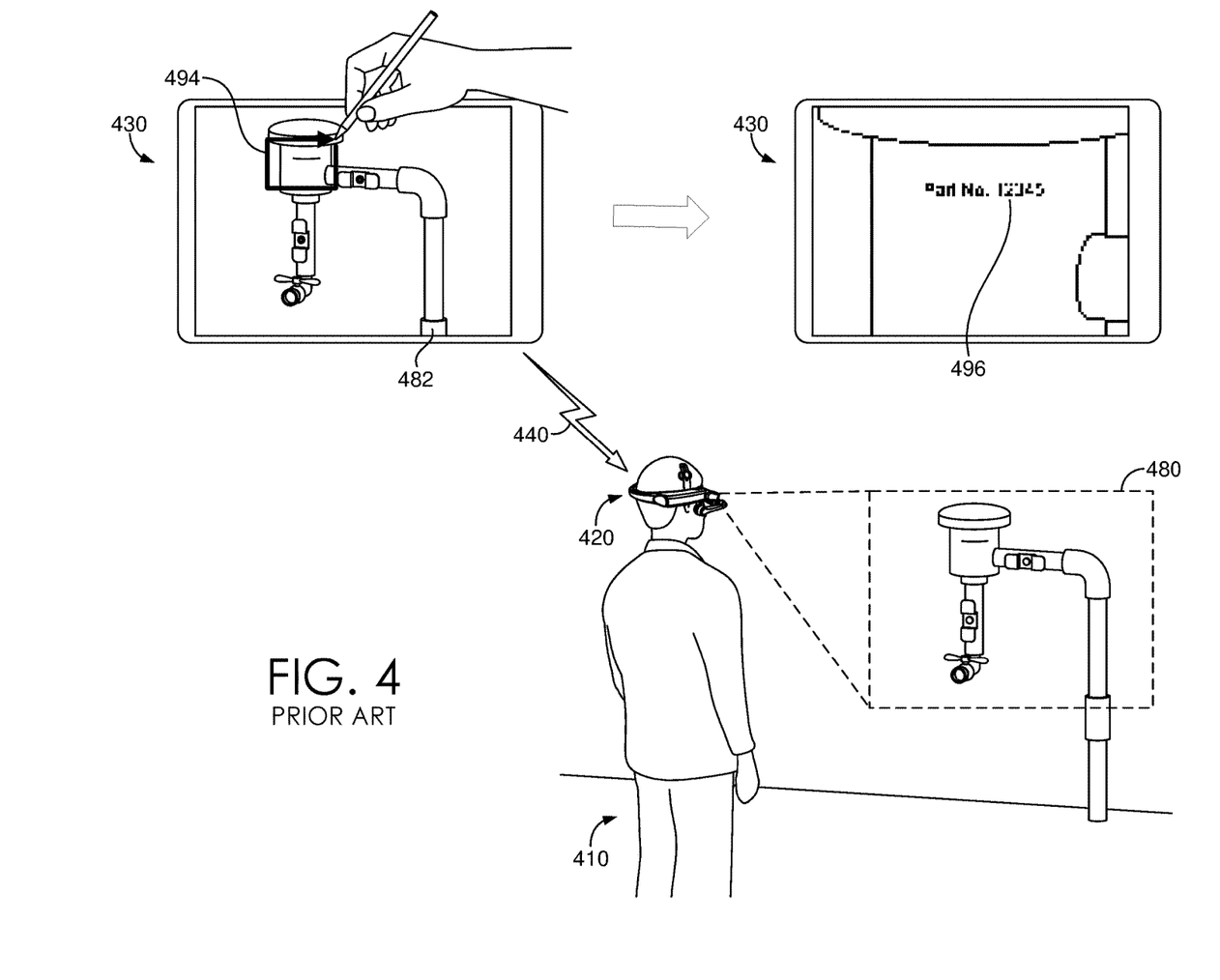
FIG. 4 shows a user employing a wearable device in conventional implementations.

FIG. 4 shows user 410 employing a wearable device 420 to provide a remote computing device 430 image data 482 generated by a sensor of the wearable device 420 in conventional implementations. More particularly, image data 482 is generated by the sensor and encodes the FOV 480 of the sensor. A communication session 440 is employed to provide compressed image data 492 corresponding to image data 482 to remote computing device 430. Communication session 440 may be enabled via a communication network, such as but not limited to communication network 110 of FIG. 1.

The image data 482 is compressed to preserve bandwidth over the communication network. Remote computing device 430 may include virtually any computing device, such as but not limited to tablet 106 or any other computing device of FIG. 1. The compressed image data 492 is displayed by a display device of remote computing device 430. Thus, the user of remote computing device 430 is enabled to view, in real-time, the FOV 480 of the sensor of wearable device 420, via the communication session 440.

In situations where the user of remote computing device 430 needs a closer look or to see additional detail (e.g., poor lighting, small barcodes, etc.), the user of remote computing device 430 may zoom in on a selected portion 494 of the compressed image data 492. However, utilizing digital zoom in conventional systems zooms merely makes a selected portion of the compressed image data 492 larger (e.g., enlarged image 496) which effectively reduces the image quality. The resulting detail visible to the user of remote computing 430 device is poor, pixelated, and/or blurry.

Figure 5:
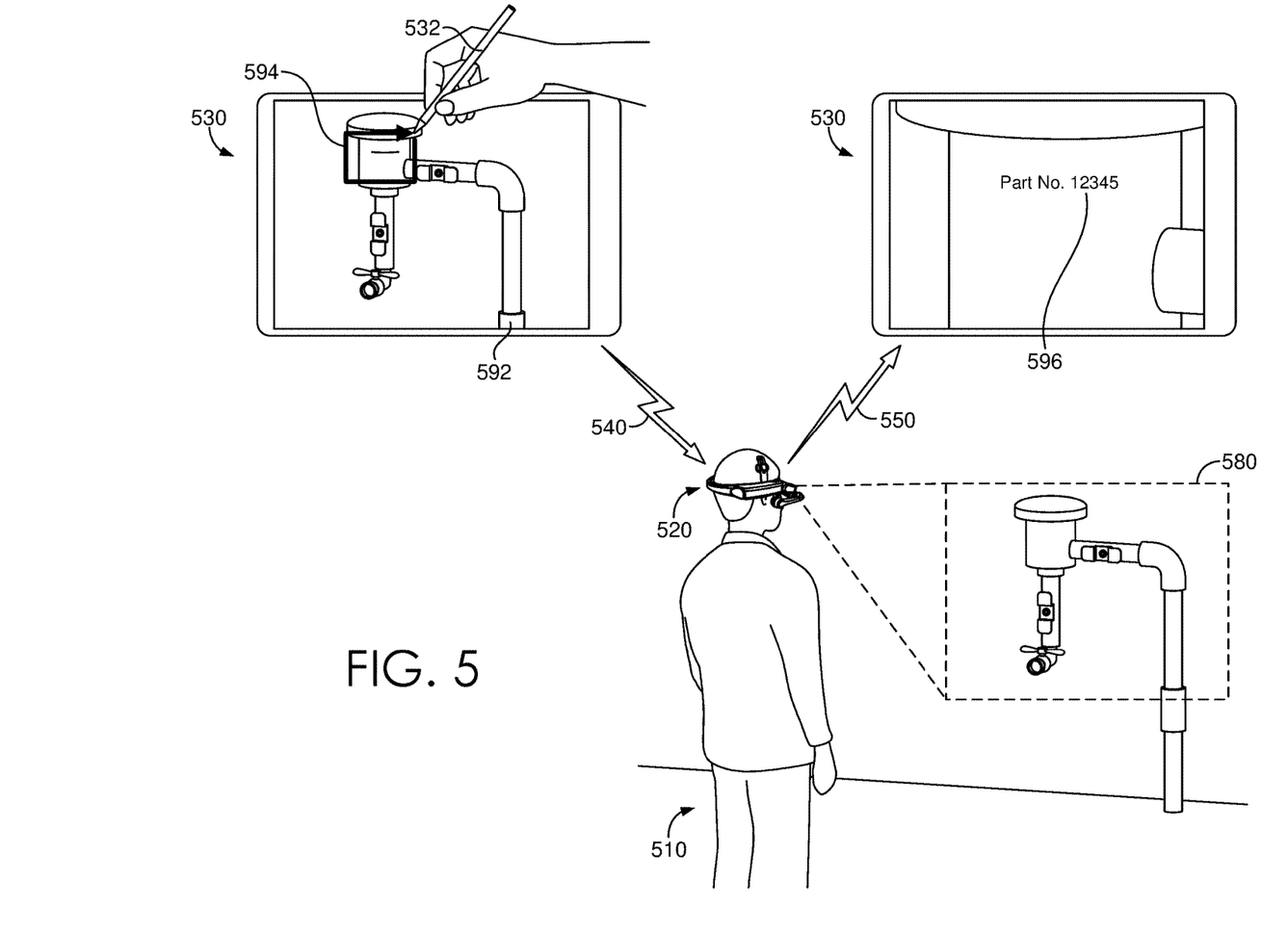
FIG. 5 shows a user employing a wearable device, in accordance with some implementations of the present disclosure.

FIG. 5 shows user 510 employing a wearable device 520 to provide a remote computing device 530 image data generated by a sensor of the wearable device 520, in accordance with some implementations of the present disclosure. More particularly, image data is generated by the sensor and encodes the FOV 580 of the sensor. A communication session 540 is employed to provide compressed image data 592 corresponding to image data to remote computing device 530. Communication session 540 may be enabled via a communication network, such as but not limited to communication network 110 of FIG. 1.

The image data is compressed to preserve bandwidth over the communication network. Remote computing device 530 may include virtually any computing device, such as but not limited to tablet 106 or any other computing device of FIG. 1. The compressed image data 592 is displayed by a display device of remote computing device 530. Thus, the user of remote computing device 530 is enabled to view, in real-time, the FOV 580 of the sensor of wearable device 520, via the communication session 540.

In situations where the user of remote computing device 530 needs a closer look or to see additional detail (e.g., poor lighting, small barcodes, etc.), the user of remote computing device 530 may employ stylus 532 or other method (e.g., mouse, touchscreen, double tap, cursor, selection tool, etc.) to dynamically select a subset area 594 of the compressed image data 592 to look at in more detail. A selection corresponding to the subset area or user-selected area 594 is received by the wearable device 520 from the remote computing device 530 via the communication session 540. The user-selected area 594 corresponds to a portion of the sensor of the wearable device 520. That is, rather than corresponding to the entire FOV 580 of the sensor, the user-selected area 594 corresponds only to the portion of the FOV 580 that encodes the portion of the sensor.

Based on the selection, an instruction is generated to capture selected image data image utilizing only the portion of the sensor corresponding to the user-selected area 594 in the same resolution as image data. Thus, image data is generated by the sensor and encodes a portion of the FOV 580 corresponding to the portion of the sensor. A communication session 550 is employed to provide compressed image data 596 corresponding to selected image data to remote computing device 530. Since the compressed image data 596 is a compressed version of only the user-selected area 594 in the same resolution as image data, the detail is preserved and the user of the remote computing device 530 is able to see the detail without the compressed image data 596 suffering from the poor, pixelated, or blurry quality as shown in enlarged image 496 of FIG. 4.

Figure 6:
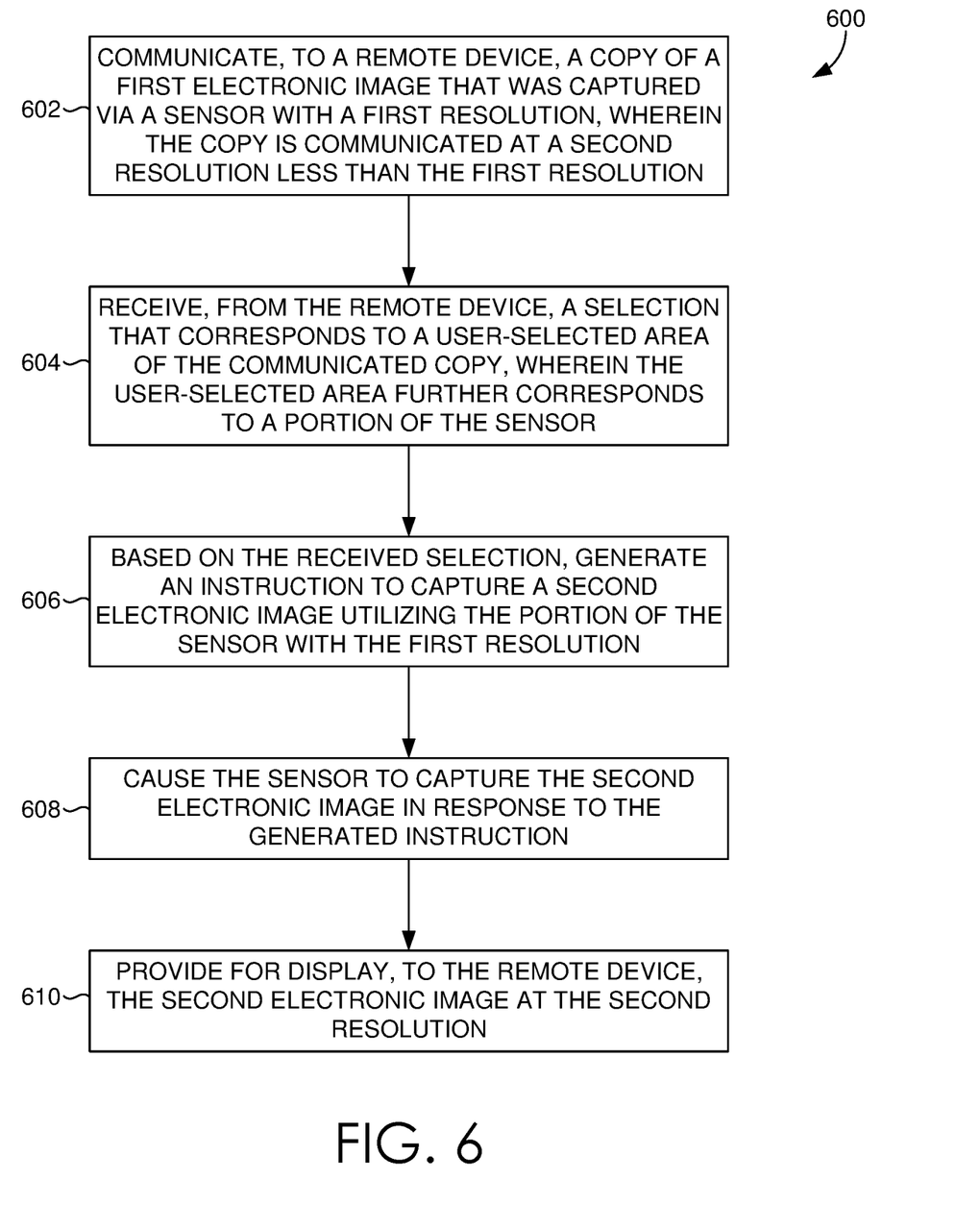
FIG. 6 provides an illustrative process flow depicting a method for remote mentor zoom, in accordance with some implementations of the present disclosure.
Figure 7:
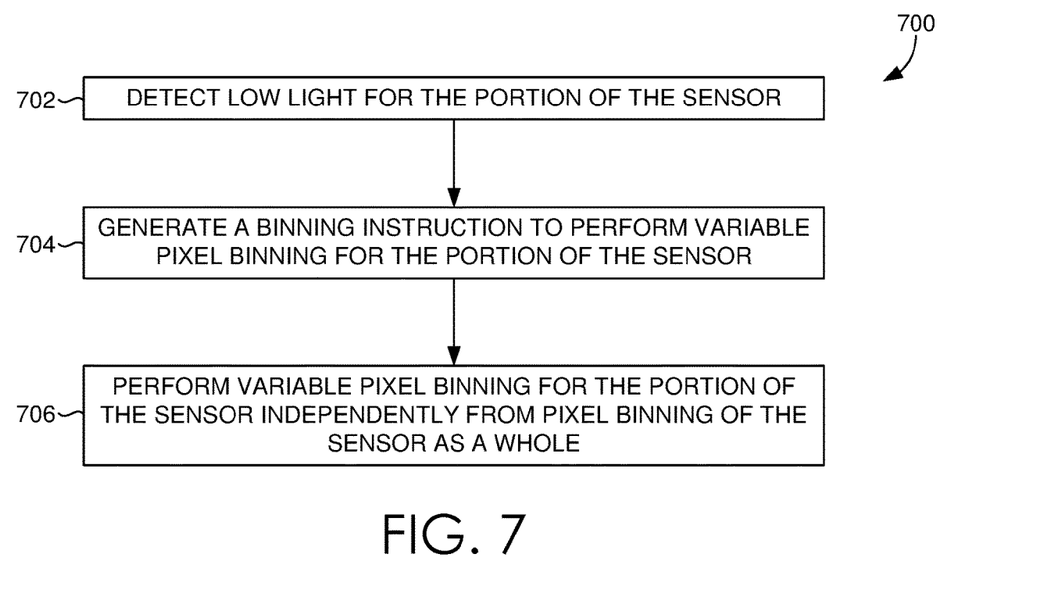
FIG. 7 provides an illustrative process flow depicting a method for variable pixel binning, in accordance with some implementations of the present disclosure.
Figure 8:
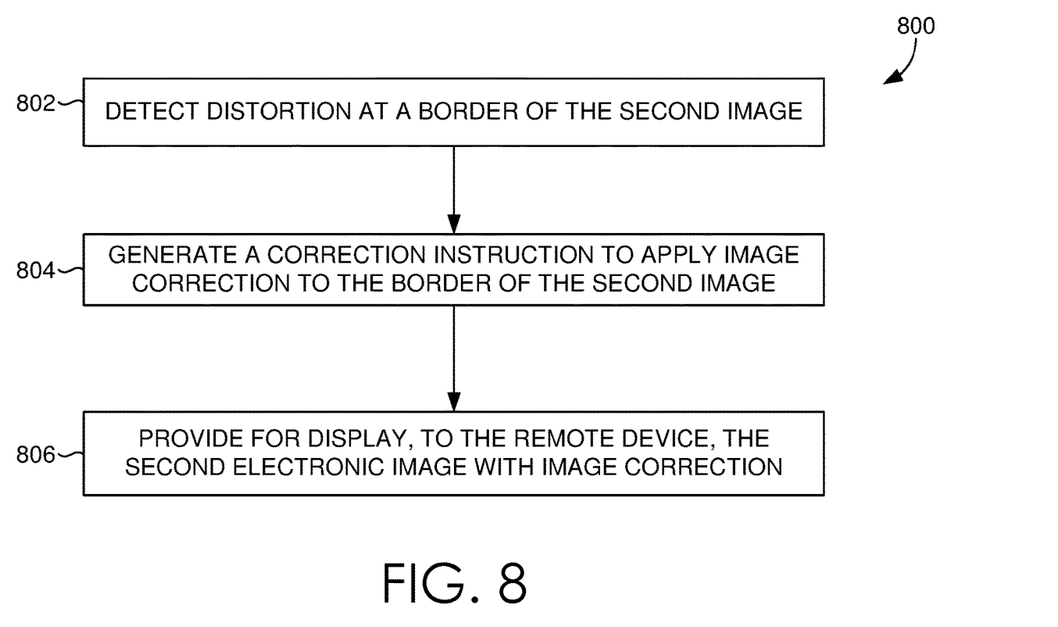
FIG. 8 provides an illustrative process flow depicting a method for image correction, in accordance with some implementations of the present disclosure.

Having described various aspects of the present disclosure, exemplary methods are described below in for operating a wearable device. Referring to FIGS. 6-8 in light of FIGS. 1-5, FIGS. 6-8 provide illustrative process flows depicting various methods for operating a wearable device, in accordance with some implementations of the present disclosure. Each block of below methods (600, 700, 800) and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Process 600 of FIG. 6 begins at block 602. At block 602, a copy of a first electronic image that was captured via a sensor with a first resolution is communicated to a remote computing device. The copy is communicated at a second resolution (e.g., 1080p) less than the first resolution (e.g., 48 MP). A sensor included in wearable device 120 of FIG. 1 may generate image data that encodes the FOV of the sensor. The wearable device may be a HMD device, such as HMD device 120 of FIG. 1 and/or HMD device 320 of FIG. 3A, 420 of FIG. 4, or 520 of FIG. 5. The remote computing device may include, but is not limited to, at least one of computing devices 102-108 of FIG. 1. A communication network, such as but not limited to communication network 110 of FIG. 1, may enable the providing of the image data.

At block 604, a selection that corresponds to a user-selected area of the communicated copy is received from the remote computing device. The selection may be communicated to the sensor via the wearable device. The user-selected area corresponds to a portion of the sensor. For example, the user-selected area may be a barcode or part number on a piece of equipment within the FOV of the sensor. The user of the remote computing device may select the barcode or part number to take a closer look. In some embodiments, the user-selected area is off-center. In other words, the user of the wearable device does not have to turn his head to enable the remote user to take a closer look at the user-selected area. In some embodiments, a user of the remote computing device is enabled to activate a laser pointer of the wearable device. The laser pointer may be visible to the user of the wearable device via a display of the wearable device.

At block 606, based on the received selection, an instruction to capture a second electronic image utilizing the portion of the sensor with the first resolution is generated. The instruction may be generated by a remote mentor engine, such as remote mentor engine 130 of FIG. 2, or a component of a remote mentor engine. The instruction may be provided to a sensor to instruct the sensor hardware to capture an image from the user-selected area that corresponds to a portion of the sensor. In this way, rather than merely zooming in on the barcode or part number, the particular user-selected area is captured by a portion of the sensor at the first resolution. This reduces the FOV to only the user-selected area, enabling that portion of the FOV to be captured at full resolution.

Accordingly, at block 608, the sensor captures the second electronic image in response to the generated instruction. In embodiments, the second electronic image is captured without suspending a video mode and activating a camera mode of the sensor.

As a result, at block 610, the second electronic image is provided to the remote computing device at the second resolution. In embodiments, only a video frame corresponding to the portion of the sensor is compressed to create the second electronic image at the second resolution. In other words, the user of the remote computing device is able to see the barcode or part number as the full FOV at the second resolution, rather than zooming in on the first electronic image and further reducing the resolution. This enables the barcode or part number to be displayed without increasing pixilation, blurring, or distortion.

Process 700 of FIG. 7 begins at block 702. At block 702, low light may be detected for the portion of the sensor corresponding to the user-selected area. For example, the barcode or part number may be in a shaded area of the FOV or may be otherwise obscured from light.

At block 704, a binning instruction is generated. The binning instruction enables variable pixel binning to be performed for the portion of the sensor corresponding to the user-selected area. The binning instruction may be generated by a remote mentor engine, such as remote mentor engine 130 of FIG. 2, or a component of a remote mentor engine. The binning instruction may be provided to a component of the sensor to instruct the sensor hardware to capture an image from the user-selected area that corresponds to a portion of the sensor.

At block 706, pixel binning is performed for the portion of the sensor independently from pixel binning of the sensor as a whole. Because a second electronic image is being captured per the instruction described with respect to FIG. 6, variable pixel binning may be performed for only the user-selected area. Since the second electronic image is provided to the remote computing device at the second resolution, variable pixel binning is more effective than pixel binning for the full image (i.e., the first electronic image) and then zooming in on that image. As a result, lighting is improved by variable pixel binning.

Process 800 of FIG. 8 begins at block 802. At block 802, distortion may be detected at a border of the second image. As can be appreciated, various forms of distortion can be introduced in photography that cause particular object to appear distorted or blurred. For example, the lens may produce curved lines where straight lines should be.

To overcome such distortion, at block 804, a correction instruction is generated to apply image correction to the border of the second image. The correction instruction may be generated by a remote mentor engine, such as remote mentor engine 130 of FIG. 2, or a component of a remote mentor engine. The correction instruction may be provided to a component of the sensor to instruct the sensor hardware to apply image correction to the second electronic image.

At block 806, the second electronic image with image correction is provided for display to the remote device. Because a second electronic image is being captured per the instruction described with respect to FIG. 6, variable image correction may be performed for only the user-selected area. In this way, variable image correction is performed for the portion of the sensor independently from image correction of the sensor as a whole. Since the second electronic image is provided to the remote computing device at the second resolution, variable image correction is more effective than image correction for the full image (i.e., the first electronic image) since new borders are created based on the user-selected area. As a result, image correction is improved utilizing variable image correction and distortion and blurriness is reduced.

Having described embodiments of the present invention, an example operating environment in which embodiments of the present invention may be implemented is described below in order to provide a general context for various aspects of the present invention.

Figure 9:
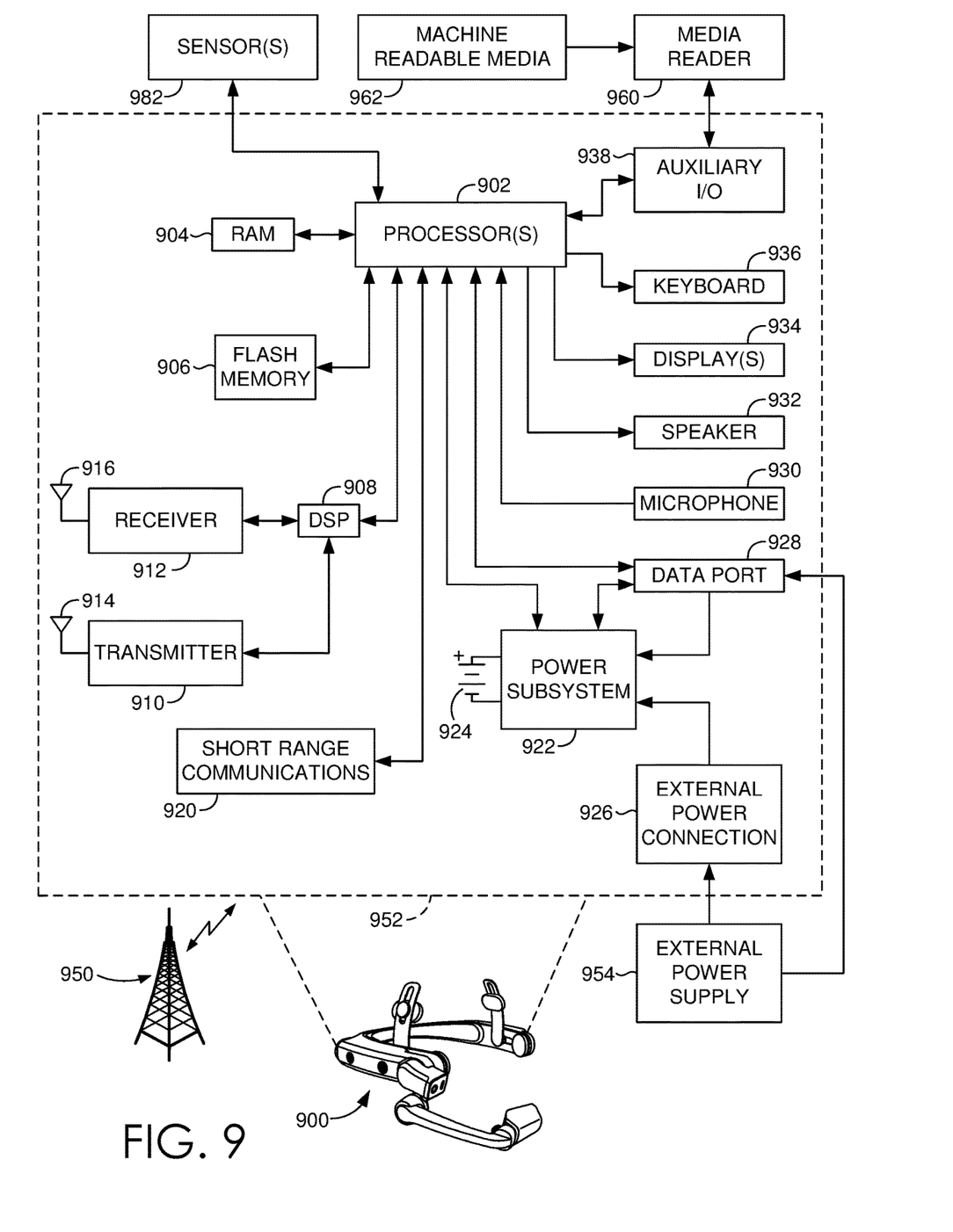
FIG. 9 provides a block diagram of an exemplary wearable device in which some implementations of the present disclosure can be employed.

FIG. 9 provides a block diagram of an exemplary wearable device 900 in which some implementations of the present disclosure may be employed. Any of the various embodiments of wearable devices discussed herein, including but not limited to HMD device 120 of FIG. 1, may include similar features, components, modules, operations, and the like as wearable device 900. In this example, wearable device 900 may be enabled for wireless two-way communication device with voice and data communication capabilities. Such wearable devices communicate with a wireless voice or data network 950 using a suitable wireless communications protocol. Wireless voice communications are performed using either an analog or digital wireless communication channel. Data communications allow the wearable device 900 to communicate with other computer systems via the Internet. Examples of wearable devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated wearable device 900 is an exemplary wearable device that includes two-way wireless communications functions. Such wearable devices incorporate communication subsystem elements such as a wireless transmitter 910, a wireless receiver 912, and associated components such as one or more antenna elements 914 and 916. A digital signal processor (DSP) 908 performs processing to extract data from received wireless signals and to generate signals to be transmitted. The particular design of the communication subsystem is dependent upon the communication network and associated wireless communications protocols with which the device is intended to operate.

The wearable device 900 includes a microprocessor 902 that controls the overall operation of the wearable device 900. The microprocessor 902 interacts with the above described communications subsystem elements and also interacts with other device subsystems such as flash memory 906, random access memory (RAM) 904, auxiliary input/output (I/O) device 938, data port 928, display 934, keyboard 936, speaker 932, microphone 930, a short-range communications subsystem 920, a power subsystem 922, and any other device subsystems.

A battery 924 is connected to a power subsystem 922 to provide power to the circuits of the wearable device 900. The power subsystem 922 includes power distribution circuitry for providing power to the wearable device 900 and also contains battery charging circuitry to manage recharging the battery 924. The power subsystem 922 includes a battery monitoring circuit that is operable to provide a status of one or more battery status indicators, such as remaining capacity, temperature, voltage, electrical current consumption, and the like, to various components of the wearable device 900.

The data port 928 is able to support data communications between the wearable device 900 and other devices through various modes of data communications, such as high speed data transfers over an optical communications circuits or over electrical data communications circuits such as a USB connection incorporated into the data port 928 of some examples. Data port 928 is able to support communications with, for example, an external computer or other device.

Data communication through data port 928 enables a user to set preferences through the external device or through a software application and extends the capabilities of the device by enabling information or software exchange through direct connections between the wearable device 900 and external data sources rather than via a wireless data communication network. In addition to data communication, the data port 928 provides power to the power subsystem 922 to charge the battery 924 or to supply power to the electronic circuits, such as microprocessor 902, of the wearable device 900.

Operating system software used by the microprocessor 902 is stored in flash memory 906. Further examples are able to use a battery backed-up RAM or other non-volatile storage data elements to store operating systems, other executable programs, or both. The operating system software, device application software, or parts thereof, are able to be temporarily loaded into volatile data storage such as RAM 904. Data received via wireless communication signals or through wired communications are also able to be stored to RAM 904.

The microprocessor 902, in addition to its operating system functions, is able to execute software applications on the wearable device 900. A predetermined set of applications that control basic device operations, including at least data and voice communication applications, is able to be installed on the wearable device 900 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the wearable device 900 through, for example, the wireless network 950, an auxiliary I/O device 938, Data port 928, short-range communications subsystem 920, or any combination of these interfaces. Such applications are then able to be installed by a user in the RAM 904 or a non-volatile store for execution by the microprocessor 902.

In a data communication mode, a received signal such as a text message or web page download is processed by the communication subsystem, including wireless receiver 912 and wireless transmitter 910, and communicated data is provided to the microprocessor 902, which is able to further process the received data for output to the display 934, or alternatively, to an auxiliary I/O device 938 or the data port 928. A user of the wearable device 900 may also compose data items, such as e-mail messages, using the keyboard 936, which is able to include a complete alphanumeric keyboard or a telephone-type keypad, in conjunction with the display 934 and possibly an auxiliary I/O device 938. Such composed items are then able to be transmitted over a communication network through the communication subsystem.

For voice communications, overall operation of the wearable device 900 is substantially similar, except that received signals are generally provided to a speaker 932 and signals for transmission are generally produced by a microphone 930. Alternative voice or audio I/O subsystems, such as a voice message recording subsystem, may also be implemented on the wearable device 900. Although voice or audio signal output is generally accomplished primarily through the speaker 932, the display 934 may also be used to provide an indication of the identity of a calling party, the duration of a voice call, or other voice call related information, for example.

Depending on conditions or statuses of the wearable device 900, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 920 provides for data communication between the wearable device 900 and different systems or devices, which need not necessarily be similar devices. For example, the short-range communications subsystem 920 includes an infrared device and associated circuits and components or a Radio Frequency based communication module such as one supporting Bluetooth® communications, to provide for communication with similarly-enabled systems and devices, including the data file transfer communications described above.

A media reader 960 connectable to an auxiliary I/O device 938 to allow, for example, loading computer readable program code of a computer program product into the wearable device 900 for storage into flash memory 906. One example of a media reader 960 is an optical drive such as a CD/DVD drive, which may be used to store data to and read data from a computer readable medium or storage product such as computer readable storage media 962. Examples of suitable computer readable storage media include optical storage media such as a CD or DVD, magnetic media, or any other suitable data storage device. Media reader 960 is alternatively able to be connected to the wearable device through the data port 928 or computer readable program code is alternatively able to be provided to the wearable device 900 through the wireless network 950.

Figure 10:
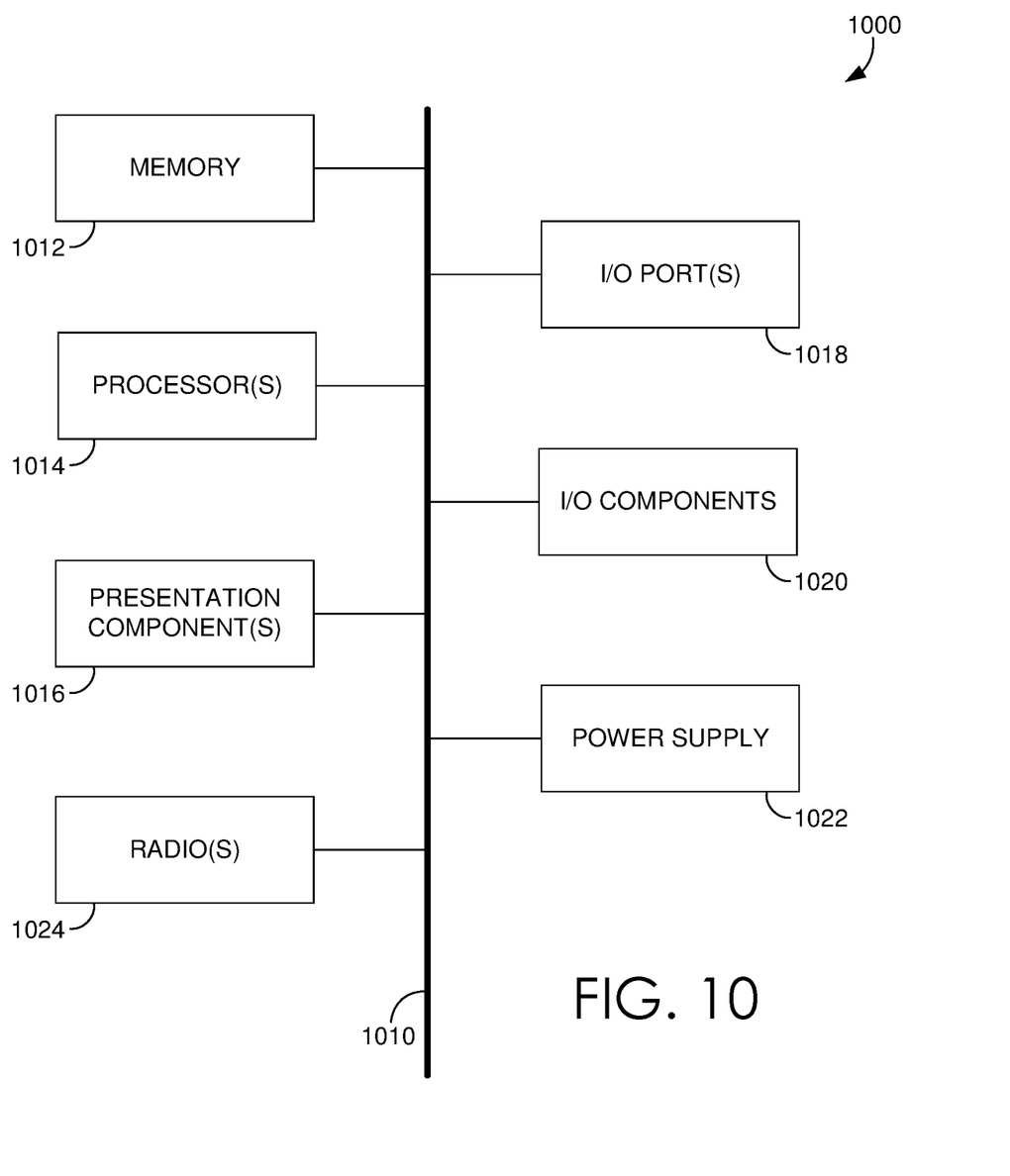
FIG. 10 provides a block diagram of an exemplary computing device in which some implementations of the present disclosure can be employed.

Referring to FIG. 10, an exemplary operating environment for implementing embodiments of the present disclosure is shown and designated generally as computing device 1000. Computing device 1000 is but one example of a suitable computing environment and is not intended to suggest any limitation as to the scope of use or functionality of the inventive embodiments. Neither should the computing device 1000 be interpreted as having any dependency or requirement relating to any one or combination of components illustrated.

The inventive embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The inventive embodiments may be practiced in a variety of system configurations, including handheld devices, consumer electronics, general-purpose computers, more specialty computing devices, etc. The inventive embodiments may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output (I/O) ports 1018, input/output (I/O) components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 10 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

Many variations can be made to the illustrated embodiment of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B, and C" means "(A), (B), (C), (A and B), (A and C), (B and C), or (A, B, and C)."

What is claimed is:

1. A computer-implemented method comprising:
capturing, by a head-mounted computing device, a first electronic image via a sensor with a first resolution;
compressing, by the head-mounted computing device, the first electronic image to create a copy of the first electronic image with a second resolution less than the first resolution;
communicating, by the head-mounted computing device, the copy of a first electronic image to a remote device over a communication session established with the remote device via a network;
receiving, by the head-mounted computing device, a selected portion of the communicated copy from the remote device, wherein the selected portion corresponds to a user-selected area of the communicated copy;
based on the selected portion, generating, by the head-mounted computing device, an instruction to capture a second electronic image utilizing a portion of the sensor that corresponds to the user-selected area;
causing, by the head-mounted computing device, the portion of the sensor to capture the second electronic image with the first resolution in response to the generated instruction;
compressing, by the head-mounted computing device, the second electronic image to create a copy of the second electronic image with the second resolution;
providing for display, by the head-mounted computing device, the copy of the second electronic image to the remote device over the established communication session.

2. The method of claim 1, wherein the user-selected area is off-center.

3. The method of claim 1, wherein the selection is communicated to the sensor via a wearable device.

4. The method of claim 1, further comprising enabling a user of the remote device to activate a laser pointer of a wearable device.

5. The method of claim 4, wherein the laser pointer is visible to a user of the wearable device via a display of the wearable device.

6. The method of claim 1, further comprising detecting low light for the portion of the sensor.

7. The method of claim 6, further comprising generating a binning instruction to perform variable pixel binning for the portion of the sensor.

8. The method of claim 7, wherein the variable pixel binning for the portion of the sensor is performed independently from pixel binning of the sensor as a whole.

9. The method of claim 1, further comprising detecting distortion at a border of the second electronic image.

10. The method of claim 9, further comprising generating a correction instruction to apply image correction to the border of the second electronic image.

11. The method of claim 10, further comprising providing for display, to the remote device, the second electronic image with image correction.

12. The method of claim 1, further comprising compressing only a video frame corresponding to the portion of the sensor to create the second electronic image at the second resolution.

13. The method of claim 1 wherein the second electronic image is captured without suspending a video mode and activating a camera mode of the sensor.

14. At least one computer storage media, having instructions thereon that, when executed by at least one processor of a computing system, cause the computing system to:
capture, by a head-mounted computing device, a first electronic image via a sensor with a first resolution;
compress, by the head-mounted computing device, the first electronic image to create a copy of the first electronic image with a second resolution less than the first resolution;
communicate, by the head-mounted computing device, the copy of a first electronic image to a remote device over a communication session established with the remote device via a network;
generate, by the head-mounted computing device, an instruction to capture a second electronic image utilizing a portion of the sensor that corresponds to a user selected area;
cause, by the head-mounted computing device, the sensor to capture the second electronic image with the first resolution in response to the generated instruction;
compressing, by the head-mounted computing device, the second electronic image to create a copy of the second electronic image with the second resolution; and
provide for display, by the head-mounted computing device to the remote device, the copy of the second electronic image to the remote device.

15. The computer storage media of claim 14, further comprising:
detecting low light for the portion of the sensor;
generating a binning instruction to perform variable pixel binning for the portion of the sensor; and
performing variable pixel binning for the portion of the sensor, wherein the variable pixel binning for the portion of the sensor is performed independently from pixel binning of the sensor as a whole.

16. The computer storage media of claim 14, further comprising:
detecting distortion at a border of the second electronic image;
generating a correction instruction to apply image correction to the border of the second electronic image; and
providing for display, to the remote device, the second electronic image with image correction.

17. The computer storage media of claim 14, further comprising enabling a user of the remote device to activate a laser pointer of a head-mounted display (HMD), wherein the laser pointer is visible to a HMD user via the HMD.

18. A computerized system comprising:
at least one processor; and
at least one computer storage media storing computer-useable instructions that, when executed by the at least one processor, causes the at least one processor to:
capture, by a head-mounted computing device, a first electronic image via a sensor with a first resolution;
compress, by the head-mounted computing device, the first electronic image to create a copy of the first electronic image with a second resolution less than the first resolution;
communicate, by the head-mounted computing device, the copy of a first electronic image to a remote device over a communication session established with the remote device by the head-mounted communication device;

receive, by the head-mounted computing device, a selected portion of the communicated copy from the remote device, wherein the selected portion corresponds to a user-selected area of the communicated copy;

based on the selected portion, generate, by the head-mounted computing device, an instruction to capture a second electronic image utilizing a portion of the sensor that corresponds to the user-selected area;

cause, by the head-mounted computing device, the portion of the sensor to capture the second electronic image with the first resolution in response to the generated instruction;

compress, by the head-mounted computing device, the second electronic image to create a copy of the second electronic image with the second resolution; and provide for display, by the head-mounted computing device, the copy of the second electronic image to the remote device over the established communication session.

19. The computerized system of claim 18, further comprising compressing only a video frame corresponding to the portion of the sensor to create the second electronic image at the second resolution.

20. The computerized system of claim 18, wherein the second electronic image is captured without suspending a video mode and activating a camera mode of the sensor.

* * * * *